United States Patent [19]

Halladay

[11] Patent Number: 5,488,081
[45] Date of Patent: Jan. 30, 1996

[54] HIGHLY DAMPED ORGANIC ELASTOMER COMPOSITION

[75] Inventor: James R. Halladay, Erie, Pa.

[73] Assignee: Lord Corporation, Cary, N.C.

[21] Appl. No.: 148,119

[22] Filed: Nov. 4, 1993

[51] Int. Cl.⁶ .................................................. C08K 5/11
[52] U.S. Cl. ..................... 524/314; 524/377; 524/485; 524/493; 524/506; 524/571; 524/575.5; 524/588; 525/101; 525/106
[58] Field of Search .................................. 524/506, 571, 524/575.5, 588, 493, 485, 314, 377; 525/101, 106

[56] References Cited

U.S. PATENT DOCUMENTS

| | | | |
|---|---|---|---|
| 2,558,584 | 6/1951 | Safford | 260/29.1 |
| 2,891,923 | 6/1959 | Phreaner | 260/37 |
| 3,355,399 | 11/1967 | Cekada, Jr. | 260/3 |
| 4,287,108 | 9/1981 | Grigo et al. | 260/29.1 |
| 4,613,640 | 9/1986 | Deisler et al. | 524/505 |
| 4,652,618 | 3/1987 | Sumida et al. | 525/478 |
| 4,678,828 | 7/1987 | Nakamura et al. | 524/265 |
| 4,935,484 | 6/1990 | Wolfgruber et al. | 528/34 |
| 4,977,200 | 12/1990 | Itoh et al. | 524/506 |
| 5,039,714 | 8/1991 | Kasahara et al. | 521/148 |
| 5,039,725 | 8/1991 | Nakamura et al. | 524/269 |

FOREIGN PATENT DOCUMENTS

| | | | |
|---|---|---|---|
| 754212 | 3/1967 | Canada | 524/506 |
| 5-86295 | 4/1993 | Japan | 524/506 |
| 2216535 | 11/1989 | United Kingdom | C08G 77/06 |

*Primary Examiner*—Mark D. Sweet
*Attorney, Agent, or Firm*—Wayne W. Rupert

[57] ABSTRACT

An elastomeric composition containing (a) a heat-vulcanizable organic elastomer, (b) a polyorganosiloxane, (c) a polyorganosilses-quioxane, and (d) a compatibilizer. The elastomeric composition can be cured and utilized in applications involving the damping of vibration and noise created by various devices. The elastomer, (a), and the two organosilicone compounds, (b) and (c), synergistically provide excellent damping characteristics throughout a broad temperature range.

17 Claims, No Drawings

HIGHLY DAMPED ORGANIC ELASTOMER COMPOSITION

FIELD OF THE INVENTION

The present invention relates to an organic elastomer mixture composition which exhibits damping characteristics. More specifically, the present invention relates to the utilization of a mixture of certain organo-silicon compounds in combination with an organic elastomer to produce a composition that exhibits excellent damping characteristics over a broad temperature range.

BACKGROUND OF THE INVENTION

Various elastomeric and rubber compositions are utilized in a wide variety of industrial applications and mechanical devices. Consequently, numerous elastomeric compositions have been developed in order to tailor the properties of the elastomeric compositions for particular uses. One industrial utilization of elastomeric compositions which has given rise to the formulation of numerous types of compositions is the utilization of elastomeric or rubber compositions in the damping of vibration and noise created by various devices. A vibration damping rubber composition, for example, is disclosed in U.S. Pat. No. 4,678,828 and is described to contain a synthetic rubbery polymer, finely divided siliceous powder, and a hydroxy-terminated diorganopolysiloxane.

Other modified elastomeric compositions are disclosed in, for example, U.S. Pat. No. 2,891,923 which describes the incorporation of thermally stable silicone oils into various rubber compositions. U.S. Pat. No. 3,355,399 discloses the reinforcement of an organic latex polymer with silsesquioxanes. U.S. Pat. No. 5,039,725 describes a rubber composition containing an EPM or EPDM rubber, an organopolysiloxane, a finely divided silica filler, and a polyoxyethylene glycol.

Many of the previously developed modified elastomeric compositions such as those described above have not been found to be useful at providing vibration or noise damping characteristics over a broad temperature range. While some of the previously developed compositions may provide adequate damping characteristics at moderate temperatures, many of these compositions become too stiff at low temperatures and/or become too flexible at high temperatures to provide consistent damping throughout a broad temperature range. A need therefore exists for an organic elastomer composition which can provide damping characteristics throughout a broad temperature range.

SUMMARY OF THE INVENTION

The present invention relates to an organic elastomer composition which is a mixture that provides damping characteristics over a broad temperature range. Specifically, the present invention relates to an elastomeric composition comprising (a) a heat-vulcanizable organic elastomer, (b) a polyorgano-siloxane, (c) a polyorganosilsesquioxane, and (d) a compatibilizer. Upon curing, the elastomer, (a), and the two organo-silicon compounds, (b) and (c), have been found to synergistically provide excellent damping characteristics throughout a broad temperature range.

DETAILED DESCRIPTION OF THE INVENTION

The heat-vulcanizable organic elastomer of the present invention can be any elastomeric material having a carbon-carbon backbone and being capable of being vulcanized at elevated temperatures. The heat-vulcanizable organic elastomer is typically natural rubber or a synthetic elastomeric material which is chemically related to natural rubber and has many of the properties of natural rubber. The synthetic elastomeric materials presently useful as a heat-vulcanizable organic elastomer are typically prepared from monomeric organic substances containing conjugated double or triple bonds in a manner that ensures that the resulting organic elastomer contains sites of unsaturation available for crosslinking or vulcanization. Examples of heat-vulcanizable organic elastomers useful for purposes of the present invention include natural rubber, polyisoprene, polybutadiene, poly(styrene-butadiene), polychloroprene, acrylonitrile/butadiene copolymer rubber, ethylene propylene copolymer rubber (EPM), ethylene propylene diene copolymer rubber (EPDM), and mixtures thereof. It is presently preferred to utilize natural rubber, polybutadiene, or mixtures thereof as the heat-vulcanizable organic elastomer of the present invention.

The heat-vulcanizable organic elastomer is typically utilized in an amount ranging from about 20 to 80, preferably from about 30 to 50, percent by weight of the total organic elastomer composition.

The polyorganosiloxane of the present invention is a linear, non-crosslinked organo-silicon compound commonly referred to as silicone oil. The polyorganosiloxane of the present invention can be represented by the following formula:

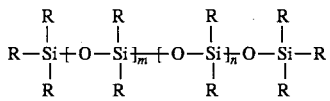

wherein R may be the same or different and is a straight-chain, branched, cyclic, or aromatic hydrocarbon radical being substituted or unsubstituted, and having from about 1 to 20 carbon atoms, preferably from about 1 to 6 carbon atoms. The hydrocarbon radical may be substituted with, for example, halogen or cyano. Examples of R include alkyl, aryl, aralkyl, alkenyl, and halogen- and cyano-substituted aryl. R is preferably a lower alkyl such as methyl, ethyl, propyl, butyl, or pentyl, and is most preferably methyl. In the above structure, m or n can be zero and the sum of (m+n) is an integer in the range from about 2 to 2000, preferably in the range from about 50 to 500. The polyorganosiloxane may be a homopolymer or a copolymer and examples of polyorganosiloxanes useful in the present invention include dimethylpolysiloxanes, diphenylpolysiloxanes, methylphenylpolysiloxanes, methylvinylpolysiloxanes, and dimethyl/phenylmethylpolysiloxane copolymers with dimethylpolysiloxanes being presently preferred.

The viscosity of the present polyorganosiloxanes is typically in the range from about 50 to 60,000, preferably from about 4,000 to 10,000 centistokes (cstk) at 25° C. The weight average molecular weight of the present polyorganosiloxanes is typically in the range from about 15,000 to 120,000, preferably from about 45,000 to 65,000.

The polyorganosilsesquioxane of the present invention is a nonlinear, crosslinked organo-silicon compound sometimes referred to as a silicone resin or powder. The polyorganosilsesquioxane of the present invention can be represented by the following formula:

$$[RSiO_x]_p$$

wherein R may be the same or different and is a straight-chain, branched, cyclic, or aromatic hydrocarbon radical, being substituted or unsubstituted, and having from about 1 to 20 carbon atoms, preferably from about 1 to 6 carbon atoms. The hydrocarbon radical may be substituted with, for example, halogen or cyano. Examples of R include alkyl, aryl, aralkyl, alkenyl, and halogen- and cyano-substituted aryl. R is preferably a lower alkyl such as methyl, ethyl, propyl, butyl, or pentyl, and is most preferably methyl. The designation x is a number between about 1.3 and 2.0, preferably between about 1.4 and 1.6, and p is an integer ranging from about 2 to 2000. For purposes of the present invention, the polyorganosilsesquioxane must be soluble in the polyorganosiloxane and should have a melting point greater than about 150° C., preferably greater than about 175° C. The polyorganosilsesquioxanes are typically in the form of a powder having a particle size ranging from about 10 to 1000, preferably from about 50 to 500 angstroms, but the particle size is not critical. It is presently preferred to use a polymethylsilsesquioxane as the polyorganosilsesquioxane of the invention.

The polyorganosilsesquioxanes are known materials and can be prepared, for example, by adding a silane of the formula $RSi(OR')_3$ to a water-sufactant mixture, with agitation under acidic or basic conditions. The preparation of polyorganosilsesquioxanes is also described in, for example, U.S. Pat. Nos. 3,355,399 and 4,935,484, and U.K. Patent Application No. 2,216,535.

The combination or mixture of the polyorganosiloxane and the polyorganosilsesquioxane is typically utilized in an amount ranging from about 3 to 30, preferably from about 10 to 20, percent by weight of the total elastomer composition. The ratio of polyorganosiloxane to polyorganosilsesquioxane in the combination or mixture typically ranges from about 3:1 to 1:3, preferably from about 1:1 to 1:2.

The compatibilizer of the present invention can be any compatibilizing or plasticizing agent which is capable of solvating the heat-vulcanizable organic elastomer, the polyorganosiloxane, and the polyorganosilsesquioxane. In other words, the compatibilizer of the invention must be capable of plasticizing the heat-vulcanizable organic elastomer while simultaneously being miscible with the mixture of the polyorganosiloxane and the polyorganosilsesquioxane. The compatibilizer of the present invention may be any of the known ester plasticizers, ether plasticizers, petroleum-based plasticizers, or combinations thereof. Examples of ester plasticizers include dioctyl sebacate, dibutyl sebacate and dioctyl adipate. Examples of ether plasticizers include tetramethylene glycol diethylether and tetraethylene glycol diethylether. Examples of petroleum-based plasticizers include naphthenic oil and aromatic oil.

The compatibilizer may also be a finely divided hydrated siliceous pigment having an average particle size below about 0.1 micron. The use of a finely divided hydrated siliceous pigment as a compatibilizer is further described in U.S. Pat. No. 2,940,947. The finely divided hydrated siliceous pigment may be used alone or in combination with one or more of the ester, ether, and petroleum-based plasticizers described above.

It is presently preferred to use dioctyl sebacate and/or napthenic oil as the compatibilizer of the present invention.

The compatibilizer is typically utilized in an amount ranging from about 1 to 30, preferably from about 5 to 20, percent by weight of the total organic elastomer composition.

The organic elastomer composition of the present invention may contain other optional ingredients such as metal oxides, antioxidants and particulate reinforcements. Specific examples of metal oxides include zinc oxide, magnesium oxide, and lead oxide, while specific examples of particulate reinforcements useful in the invention include carbon black, precipitated silica, and fumed silica. The optional particulate reinforcement may be utilized in various amounts up to about 50 percent by weight of the heat-vulcanizable organic elastomer.

The ingredients of the present organic elastomer composition are typically combined by mixing to form a mixture in a banbury or other typical internal mixer at a temperature ranging from about 130° C. to 180° C. for about 5 to 10 minutes. Once mixing is complete, the organic elastomer composition may be formed into any desired shape and cured or vulcanized so as to form an elastomeric material suitable for use in, for example, damping applications. Curing or vulcanizing of the organic elastomer coinposition is typically carried out by injection, compression, or transfer molding, as is known in the art. Curing conditions typically involve temperatures ranging from 130° C. to 200° C., preferably from 150° C. to 170° C. for a period of time ranging from 5 to 30 minutes depending on cure temperature.

After cure or vulcanization, the organic elastomer compositions of the present invention may be effectively utilized in damping applications at temperatures ranging from about −55° C. to +125° C., without exhibiting adverse damping characteristics.

The following examples are provided for purposes of illustrating the present invention.

EXAMPLE 1

An organic elastomer composition is prepared utilizing the following amounts (in parts by weight or pbw) of ingredients:

| Ingredient | Amount (pbw) |
| --- | --- |
| Polybutadiene rubber[a] | 160.0 |
| Dimethylpolysiloxane (500 cstk) | 12.5 |
| Polymethylsilsesquioxane[b] | 25.0 |
| Naphthenic Oil | 12.5 |

[a]Sulfur-cured polybutadiene rubber containing 50 pbw carbon black and 10 pbw curatives and additives
[b]PR 6155-Huls America, Inc.

The above ingredients are mixed in a banbury mixer at 150° C. for approximately 5 minutes and the resulting organic elastomer composition is cured and bonded in a transfer mold at approximately 162° C. for 15 minutes to form a durable lap shear test specimen in accordance with the guidelines in ASTM-D-2231.

COMPARATIVE EXAMPLE 2

An organic elastomer composition is prepared and cured in accordance with Example 1 except that 25 pbw of naphthenic oil is utilized and the two organo-silicon compounds are omitted from the composition.

The resulting double lap shear specimens of Examples 1 and 2 are then tested for various dynamic properties at 21° C. and −55° C. on a Dynafast servohydraulic test machine. The dynamic properties tested include G' (elastic shear modulus) and tan delta (loss factor) at ±10 percent strain and 10 hertz. The results of the dynamic testing of Examples 1 and 2 are set forth below in Table 1.

TABLE 1

|  | Temperature | G' | tan delta |
|---|---|---|---|
| Example 1 | 21° C. | 212 | .37 |
| Example 2 | 21° C. | 171 | .23 |
| Example 1 | −55° C. | 584 | .41 |
| Example 2 | −55° C. | 358 | .39 |

EXAMPLE 3

An organic elastomer composition is prepared, cured, and tested in accordance with Example 1 utilizing the following amounts of ingredients:

| Ingredient | Amount (pbw) |
|---|---|
| Poly(styrene-butadiene) rubber[a] | 110 |
| Dimethyl/phenylmethyl polysiloxane (1000 cstk) | 15 |
| Polymethylsilsesquioxane[b] | 20 |
| Carbon Black | 100 |
| Naphthenic Oil | 35 |
| Dioctyl sebacate | 15 |

[a] Sulfur-cured poly(styrene-butadiene) rubber containing 10 pbw curatives and additives
[b] PR 6155-Huls America, Inc.

The results of the dynamic testing of the above composition at 21° C., −55° C., and 75° C. is set forth below in Table 2.

TABLE 2

|  | Temperature | G' | tan delta |
|---|---|---|---|
| Example 3 | 21° C. | 186 | .52 |
| Example 3 | −55° C. | 397 | .72 |
| Example 3 | 75° C. | 133 | .48 |

As can be seen from the above data, the organic elastomer compositions of the present invention provide for damping characteristics superior to an organic elastomer composition which does not contain the present mixture of organo-silicon compounds. The data also shows that the present compositions are capable of exhibiting excellent damping characteristics at extreme temperatures.

What is claimed is:

1. An elastomeric composition consisting essentially of a mixture comprising (a) a heat-vulcanizable organic elastomer which is selected from the group consisting of natural rubber, polyisoprene, polybutadiene, polychloroprene, acrylonitrile/butadiene copolymer rubber, and mixtures thereof, the heat-vulcanizable organic elastomer being present in an amount ranging from about 20 to 80 percent by weight of total elastomer Composition, (b) a polyorganosiloxane wherein the polyorganosiloxane is represented by the following formula:

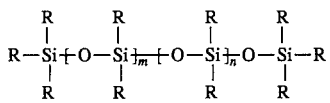

wherein R may be the same or different and is a straight-chain, branched, cyclic, or aromatic hydrocarbon radical, and having from about 1 to 20 carbon atoms and wherein m or n can be zero and the sum of (m+n) is an integer in the range from about 2 to 2000

(c) a polyorganosilsesquioxane, and (d) a compatibilizer; the compatibilizer being present in an amount ranging from about 1 to 30 percent by weight of the total elastomer composition, and the combination of the polyorganosiloxane and the polyorganosilsesquioxane being present in an amount ranging from about 3 to 30 percent by weight of the total elastomer composition, wherein the ratio of polyorganosiloxane to polyorganosilsesquioxane in the combination ranges from about 3:1 to 1:3.

2. An elastomeric composition according to claim 1 wherein R is selected from the group consisting of methyl, ethyl, propyl, butyl, and pentyl, and the sum of (m+n) is an integer in the range from about 50 to 500.

3. An elastomeric composition according to claim 2 wherein R is methyl.

4. An elastomeric composition according to claim 1 wherein the polyorganosiloxane is selected from the group consisting of dimethylpolysiloxanes, diphenylpolysiloxanes, methylphenylpolysiloxanes, methylvinylpolysiloxanes, and dimethyl/phenylmethylpolysiloxane copolymers.

5. An elastomeric composition according to claim 4 wherein the polyorganosiloxane is dimethylpolysiloxane.

6. An elastomeric composition according to claim 1 wherein the polyorganosilsesquixone is represented by the following formula:

$$(RSiO_x)p$$

wherein R may be the same or different and is a straight-chain, branched, cyclic, or aromatic hydrocarbon radical, and having from about 1 to 20 carbon atoms and wherein x is a number between about 1.3 and 2.0 and p is an integer ranging from about 2 to 2000.

7. An elastomeric composition according to claim 6 wherein x is a number between about 1.4 and 1.6.

8. An elastomeric composition according to claim 6 wherein the polyorganosilsesquioxane is soluble in the polyorganosiloxane and has a melting point greater than about 150° C.

9. An elastomeric composition according to claim 8 wherein the polyorganosilsesquioxane has a melting; point greater than about 175° C.

10. An elastomeric composition according to claim 1 wherein the polyorganosilsesquioxane is a polymethylsilsesquioxane.

11. An elastomeric composition according to claim 1 wherein the compatibilizer is capable of plasticizing the heat-vulcanizable organic elastomer while simultaneously being miscible with the mixture of the polyorganosiloxane and the polyorganosilsesquioxane.

12. An elastomeric composition according to claim 11 wherein the compatibilizer is selected from the group consisting of ester plasticizers, ether plasticizers, petroleum-based plasticizers, and combinations thereof.

13. An elastomeric composition according to claim 12 wherein the ester plasticizer is dioctyl sebacate, dibutyl sebacate or dioctyl adipate; the ether plasticizer is tetramethylene glycol diethylether or tetraethylene glycol diethylether; and the petroleum-based plasticizer is naphthenic oil or aromatic oil.

14. An elastomeric composition according to claim 12 wherein the compatibilizer is dioctyl sebacate, napthenic oil, or a combination thereof.

15. An elastomeric composition according to claim 1 wherein the compatibilizer is a finely divided hydrated siliceous pigment having an average particle size below about 0.1 micron.

16. An elastomeric composition according to claim 1 wherein the heat-vulcanizable organic elastomer is present in an amount ranging from about 30 to 50 percent by weight of the total elastomer composition, the compatibilizer is present in an amount ranging from about 5 to 20 percent by weight of the total elastomer composition, and the combination of the polyorganosiloxane and the polyorganosilsesquioxane is present in an amount ranging from about 10 to 20 percent by weight of the total elastomer composition wherein the ratio of polyorganosiloxane to polyorganosilsesquioxane in the combination ranges from about 1:1 to 1:2.

17. An elastomeric composition consisting essentially of a mixture comprising (a) a heat-vulcanizable organic elastomer, being selected from the group consisting of natural rubber, polybutadiene, and mixtures thereof, said heat-vulcanizable organic elastomer being present in an amount ranging from about 20 to 80 percent by weight of total elastomer composition, (b) a polyorganosiloxane wherein the polyorganosiloxane is represented by the following formula:

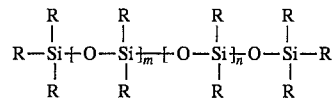

wherein R may be the same or different and is a straight-chain, branched, cyclic, or aromatic hydrocarbon radical, and having from about 1 to 20 carbon atoms and wherein m or n can be zero and the sum of (m+n) is an integer in the range from about 2 to 2000

(c) a polyorganosilsesquioxane, and (d) a compatibilizer; the compatibilizer being present in an amount ranging from about 1 to 30 percent by weight of the total elastomer composition, and the combination of the polyorganosiloxane and the polyorganosilsesquioxane being present in an amount ranging from about 3 to 30 percent by weight of the total elastomer composition, wherein the ratio of polyorganosiloxane to polyorganosilsesquioxane in the combination ranges from about 3:1 to 1:3.

* * * * *